United States Patent
Burgio et al.

(10) Patent No.: US 11,121,938 B2
(45) Date of Patent: Sep. 14, 2021

(54) PERFORMANCE MEASUREMENT IN A PACKET-SWITCHED COMMUNICATION NETWORK

(71) Applicant: TELECOM ITALIA S.p.A., Milan (IT)

(72) Inventors: Francesco Burgio, Turin (IT); Luca Maria Castaldelli, Turin (IT); Angelo Franceschini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/331,308

(22) PCT Filed: Sep. 14, 2016

(86) PCT No.: PCT/EP2016/071644
§ 371 (c)(1),
(2) Date: Mar. 7, 2019

(87) PCT Pub. No.: WO2018/050215
PCT Pub. Date: Mar. 22, 2018

(65) Prior Publication Data
US 2019/0356557 A1 Nov. 21, 2019

(51) Int. Cl.
*H04L 12/24* (2006.01)
*H04L 12/26* (2006.01)
*H04L 12/801* (2013.01)

(52) U.S. Cl.
CPC ........ *H04L 41/5009* (2013.01); *H04L 43/026* (2013.01); *H04L 43/028* (2013.01);
(Continued)

(58) Field of Classification Search
None
See application file for complete search history.

(56) References Cited

U.S. PATENT DOCUMENTS 5,477,531 A * 12/1995 McKee .................. H04L 1/243
370/249
6,363,056 B1 3/2002 Beigi et al.
(Continued)

FOREIGN PATENT DOCUMENTS

EP 2 374 241 B1 8/2012
EP 2 636 185 B1 7/2014
(Continued)

OTHER PUBLICATIONS

International Search Report dated Jan. 26, 2017, in PCT/EP2016/071644 filed on Sep. 14, 2016.
(Continued)

*Primary Examiner* — Rebecca E Song
(74) *Attorney, Agent, or Firm* — Oblon, McClelland, Maier & Neustadt, L.L.P.

(57) ABSTRACT

A method for performance measurement in packet switched communication networks includes generating a flow of artificial packets having predefined packets lengths, which is then aggregated to the packet flow to be measured by an aggregator. The artificial packets are configured to follow the packet flow to be measured, starting from the point where aggregation is performed. Two measurement points are then provided after the aggregator, which identify the artificial packets based on their packet lengths and provide respective raw performance measurements indicative of the actual positions of the artificial packets in the aggregated packet flow. The raw performance measurements are then used for providing the performance measurements. Since the artificial packets are identified based on their packet lengths, no inspection of the packets' content is needed for identification purposes. The artificial packets may therefore be identified even if their content is uninspectable.

15 Claims, 3 Drawing Sheets

(52) U.S. Cl.
CPC ........ *H04L 43/087* (2013.01); *H04L 43/0829* (2013.01); *H04L 43/0894* (2013.01); *H04L 47/34* (2013.01)

(56) References Cited

U.S. PATENT DOCUMENTS

| | | |
|---|---|---|
| 8,730,821 B2 | 5/2014 | Song et al. |
| 2013/0003565 A1 | 1/2013 | Gotwals et al. |
| 2014/0328206 A1* | 11/2014 | Chan .................. H04L 43/0829 370/253 |
| 2016/0218839 A1* | 7/2016 | Lanzone ................ H04L 5/005 |
| 2016/0380871 A1 | 12/2016 | Gotwals et al. |
| 2017/0078180 A1* | 3/2017 | Hagh .................. H04L 43/0882 |

FOREIGN PATENT DOCUMENTS

| | | | |
|---|---|---|---|
| EP | 2 520 059 B1 | 11/2014 | |
| EP | 2 802 103 A1 | 11/2014 | |
| WO | WO-2014191048 A1 * | 12/2014 | ......... H04L 43/0852 |

OTHER PUBLICATIONS

ITU-T G.8013/Y.1731, Jul. 2011, paragraphs 8.1-8.2, pp. 26-32.
Hofstede, R. et al., "Flow Monitoring Explained: From Packet Capture to Data Analysis with NetFlow and IPFIX", IEEE Communication Surveys & Tutorials, vol. 16, No. 4, May 12, 2014, pp. 2037-2064.
Office Action dated Feb. 11, 2020 in corresponding European Patent Application No. 16 766 923.3, citing documents AA and AO therein, 6 pages.

* cited by examiner

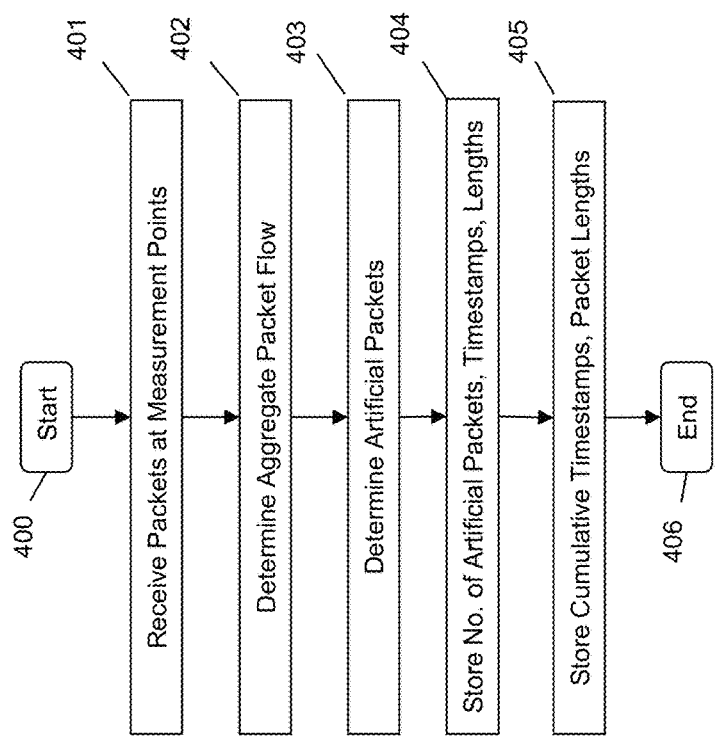
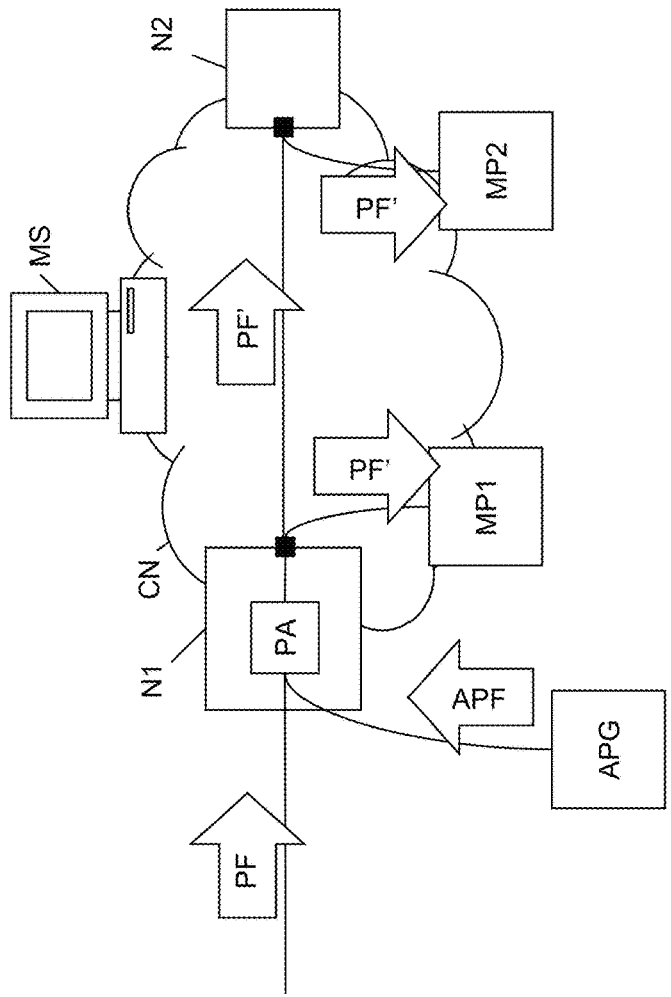

PERFORMANCE MEASUREMENT IN A PACKET-SWITCHED COMMUNICATION NETWORK

TECHNICAL FIELD

The present invention relates to the field of communication networks. In particular, the present invention relates to a method and system for performing a performance measurement in a packet-switched communication network.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

Packets may be lost during transmission through the network, for a number of reasons. For instance, a node or link may fail, or packets may be discarded by a node due to a congestion of its ports. Moreover, packets may be discarded by a node since they contain bit errors.

Further, a packet is transmitted at a transmission time by the source node and is received at a reception time by the destination node. The time elapsing between transmission time and reception time is typically called "one-way delay". Moreover, packets of a same packet flow may have different one-way delays, namely there are subject to a certain "inter-arrival jitter" (or, briefly, "jitter"). The jitter may be calculated, for example, as the difference between the one-way delays of two packets of a same data flow.

When a communication service (in particular, a real-time voice or data service such as call, conference call, video conference, etc.) is provided by means of a packet-switched network, a measurement of packet loss, one-way delay and jitter affecting the packet flow carrying the service provides an indication of the quality of service (QoS) perceived by the end users of the service. Therefore, measuring packet loss, one-way delay and/or jitter of packet flows in a communication network is of particular interest for network operators.

ITU-T G.8013/Y.1731 (07/211), par. 8.1-8.2 (pages 26-32) describes a frame loss measurement and a frame delay measurement making use of OAM (Operation Administration Maintenance) frames injected in the flow of frames to be measured.

U.S. Pat. No. 8,730,821 discloses a packet loss detection method which provides for transmitting data packets and OAM packets, writing a counting value of data packets transmitted between two OAM packets into a subsequent OAM packet after a time delay, counting the number of data packets received between two OAM packets and calculating the packet loss rate based on the number of practically received data packets and the counting value carried by the subsequent OAM packet.

Moreover, EP2374241, EP2520059 and EP2636185 in the name of the same Applicant disclose methods for measuring packet loss and/or delay and/or jitter, wherein the packets of the packet flow to be measured are marked so as to divide the packet flow into blocks of packets having a first marking value which alternate in time with blocks of packets having a second marking value. Counters and timestamps relating to each block are updated or generated at two measurement points for providing packet loss measurements and/or delay measurements and/or jitter measurements.

SUMMARY OF THE INVENTION

The Applicant has noticed that the above cited known methods described by ITU-T G.8013/Y.1731 and U.S. Pat. No. 8,730,821 provide accurate measurement results if the OAM packets are precisely inserted into predefined positions of the packet flow to be measured. Specifically, each OAM packet shall be transmitted upon lapse of a predefined transmission period or after a predefined number of data packets have been transmitted since transmission of the last OAM packet. However, since the SW/HW resources of a network element available for the insertion of the OAM packets are typically limited, an unpredictable mismatch may exist between the predefined positions at which the OAM packets shall be inserted and their actual positions into the packet flow (typically, the actual positions of the OAM packets are delayed relative to the desired predefined positions). This limits the accuracy of the measurement results provided by those known methods.

On the other hand, the methods described by EP2374241, EP2520059 and EP2636185 require marking the packets of the packet flow to be measured. However, the marking functionality may be not implementable at every network element.

The Applicant has noticed that, in principle, accurate performance measurements requiring neither modifications (marking) of the content of data packets carrying user traffic nor precise insertion of artificial packets at predefined positions of the packet flow to be measured could be provided by generating a flow of artificial packets, aggregating them with the packet flow to be measured and providing two or more measurement points located downstream aggregation, which provide raw performance measurements indicative of the actual positions of the artificial packets in the aggregated packet flow.

In the following description and in the claims, the expression "performing a performance measurement on a packet flow" will designate an operation of measuring:
  a one-way delay, a two-way delay or a jitter induced on packets of said packet flow by transmission between the two measurement points; and/or
  a packet loss induced on packets of said packet flow by transmission between the two measurement points.

Further, in the present description and in the claims, the expression "artificial packet" will designate a packet generated and injected into the communication network by one or more devices controlled by the network manager, for the specific purpose of implementing a performance measurement. Artificial packets therefore do not carry any user traffic, and their content (namely, the content of their header and payload) and well as their transmission rate is controlled by the network manager. Furthermore, in the description and in the claims, the expression "data packet" will designate a packet carrying user traffic, the generation and transmission of data packets being in charge to network users, not to the network manager. Both the content and the transmission rate of such data packets are therefore not under the control of the network manager.

The above technique that, in principle, could allow overcoming the drawbacks of the known performance measurement methods requires that the measurement points are capable of distinguishing the artificial packets from the data packets. To this purpose, the artificial packets may comprise one or more bits of their header set to a value different from that of the data packets, or they may comprise a dedicated source address or destination address, or they may comprise an identifier in their payload. In any case, in order to identify the artificial packets, each measurement point shall inspect the packet content.

However, in some cases, a measurement point may be unable to inspect the content of the received packets. This may happen for instance within an IPSec tunnel, wherein both artificial packets and data packets are encrypted and encapsulated at a first IPSec peer initiating the tunnel, and then transmitted to a second IPSec peer terminating the tunnel that decrypts and de-encapsulates the packets. Measurement points located within the tunnel can not inspect the encrypted content of the encapsulated packets, and therefore can not distinguish artificial packets from data packets.

In other cases, the header bits used for marking the artificial packets may be overwritten, e.g. by a node placed at an administrative boundary. Measurement points located downstream such node are accordingly unable to distinguish artificial packets from data packets based on the value of such bits.

In view of the above, it is an object of the present invention to provide a method for performing a performance measurement on a packet flow transmitted along a path through a packet switched communication network which overcomes the aforesaid drawback.

In particular, it is an object of the present invention to provide a method for performing a performance measurement on a packet flow transmitted along a path through a packet switched communication network which does not require modifications of the content of data packets carrying user traffic, which does not require a precise insertion of artificial packets at predefined positions of the packet flow to be measured and which allows identification of the artificial packets without relying on the packet's content, which in some cases may be inaccessible by the measurement points and/or unusable for identification purposes.

According to embodiments of the present invention, the performance of a packet flow are measured by providing an artificial packet generator which generates a flow of artificial packets having predefined lengths and a packet aggregator that, at a node located on the path of the packet flow to be measured, aggregates the artificial packets with the packet flow to be measured into an aggregated packet flow. The artificial packets are configured to follow at least a length of the path of the packet flow to be measured, following to the node wherein aggregation is carried out. At least two measurement points are also provided on the path length followed by the artificial packets aggregated with the packet flow to be measured, which identify the artificial packets based on their packet length and provide respective raw performance measurements indicative of the actual positions of the artificial packets in the aggregated packet flow. The raw performance measurements are then used for providing performance measurement on the packet flow to be measured.

Advantageously, the measurement results are accurate without the need to precisely insert the artificial packets at predetermined positions of the packet flow to be measured. Even if the aggregator introduces an unpredictable delay between the time at which an artificial packet is received from the artificial packet generator and the time at which this artificial packet is actually inserted in the packet flow to be measured, the measurement results are advantageously accurate, since all the raw performance measurements take into account such unpredictable delay. Accurate measurement results are therefore obtained even when the SW/HW resources available at the node at which aggregation is performed are limited.

Moreover, no marking of the data packets of the packet flow to be measured is needed. Hence, the method may be carried out even when the marking functionality can not be implemented at the nodes of the communication network (e.g. nodes of different network operators).

Moreover, advantageously, the measurement points identify the artificial packets based on their length, and therefore without relying on their content. Therefore, even if the packet content is uninspectable (e.g. because both the artificial packets and the data packets are encrypted and/or encapsulated within a tunnel) or if the packet content is changed as the packets propagate along their path (e.g. by a node placed at an administrative boundary), all the measurement points located along the path may nonetheless recognize the artificial packets.

According to a first aspect, the present invention provides for a method for performing a performance measurement on a packet flow transmitted along a path through a packet switched communication network, the method comprising:

a) generating a flow of artificial packets having predefined packet lengths;

b) aggregating the flow of artificial packets with the packet flow at a node of the communication network located along the path, so as to provide an aggregated packet flow which is transmitted along at least a length of path starting from the node;

c) at a first measurement point located along said length of path, identifying the artificial packets based on the predefined packet lengths and providing a first raw performance measurement indicative of actual positions of the artificial packets in the aggregated packet flow;

d) at a second measurement point located along said length of path, identifying the artificial packets based on the predefined packet lengths and providing a second raw performance measurement indicative of actual positions of the artificial packets in the aggregated packet flow; and e) performing a performance measurement of the packet flow using the first and second raw performance measurements.

Preferably, step a) comprises grouping the artificial packets into bursts of N artificial packets, N being equal to or higher than 1.

According to some embodiments, the artificial packets have a same predefined packet length.

According to other embodiments, at step a) the number N of artificial packets per burst is equal to or higher than 2 and the N artificial packets of each burst have different predefined packet lengths ordered according a predefined ordered sequence of packet lengths.

According to a first variant, at step a) the predefined ordered sequence of packet lengths is the same in all the bursts of N artificial packets.

According to a second variant, at step a) the predefined ordered sequence of packet lengths is different in different bursts of N artificial packets.

Preferably, said step b) comprises aggregating the flow of artificial packets so that the artificial packets split the packet flow into a sequence of blocks of data packets, each burst of artificial packets delimiting two consecutive blocks of data packets.

Preferably, each one of steps c) and d) comprises identifying the artificial packets in the aggregated packet flow by comparing a packet length of each received packet of the aggregated packet flow with the predefined packet lengths.

If the artificial packets are grouped in bursts of N≥2 artificial packets with different packets lengths ordered according to a predefined ordered sequence, each one of steps c) and d) preferably comprises identifying the bursts of N artificial packets in the aggregated packet flow by checking whether a locally stored ordered list of packet lengths of received packets of the aggregated packet flow contains any occurrence of the predefined ordered sequence of packet lengths, each occurrence of the predefined ordered sequence of packet lengths in the list being identified as a burst of artificial packets.

Preferably, each one of steps c) and d) comprises, upon identification of each burst of artificial packets, storing at least one of:
(i) a counter indicating a number of artificial packets comprised in the identified burst;
(ii) timestamps of artificial packets comprised in the identified burst; and
(iii) packet lengths of artificial packets comprised in the identified burst.

Preferably, each one of steps c) and d) comprises, upon identification of each burst of artificial packets, storing at least one of:
(i) a counter indicating a number of received data packets comprised in a block of data packets terminated by the identified burst;
(ii) a cumulative timestamp of data packets comprised in the block of data packets terminated by the identified burst; and
(iii) a cumulative packet length of data packets comprised in the block of data packets terminated by the identified burst.

Preferably, step e) comprises measuring at least one of:
a one-way delay of each artificial packet;
a jitter of the flow of artificial packets;
a packet loss of the flow of artificial packets;
a packet loss of the packet flow;
an average one-way delay of each block of data packets of the packet flow;
an average jitter of the packet flow; and
a throughput of the packet flow.

According to a second aspect, the present invention provides for a system for performing a performance measurement on a packet flow transmitted along a path through a packet switched communication network, the system comprising:
a) an artificial packet generator configured to generate a flow of artificial packets having predefined packet lengths;
b) a packet aggregator implemented at a node located along said path and configured to aggregate said flow of artificial packets with said packet flow, so as to provide an aggregated packet flow which is transmitted along at least a length of said path starting from said node;
c) a first measurement point located along said length of path and configured to identify the artificial packets based on the predefined packet lengths and to provide a first raw performance measurement indicative of actual positions of the artificial packets in the aggregated packet flow;
d) a second measurement point located along said length of path and configured to identify the artificial packets based on the predefined packet lengths and to provide a second raw performance measurement indicative of actual positions of the artificial packets in the aggregated packet flow; and
e) a management server configured to perform a performance measurement of the packet flow using the first and second raw performance measurements.

According to a third aspect, the present invention provides for a communication network comprising the system as set forth above.

According to a fourth aspect, the present invention provides for a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein:

FIG. 1 schematically shows an exemplary packet-switched network where the performance method according to embodiments of the present invention is implemented;

FIG. 4 is a flow chart of the operation of the measurement points according to embodiments of the present invention.

DETAILED DESCRIPTION OF PREFERRED EMBODIMENTS OF THE INVENTION

Figure 2:
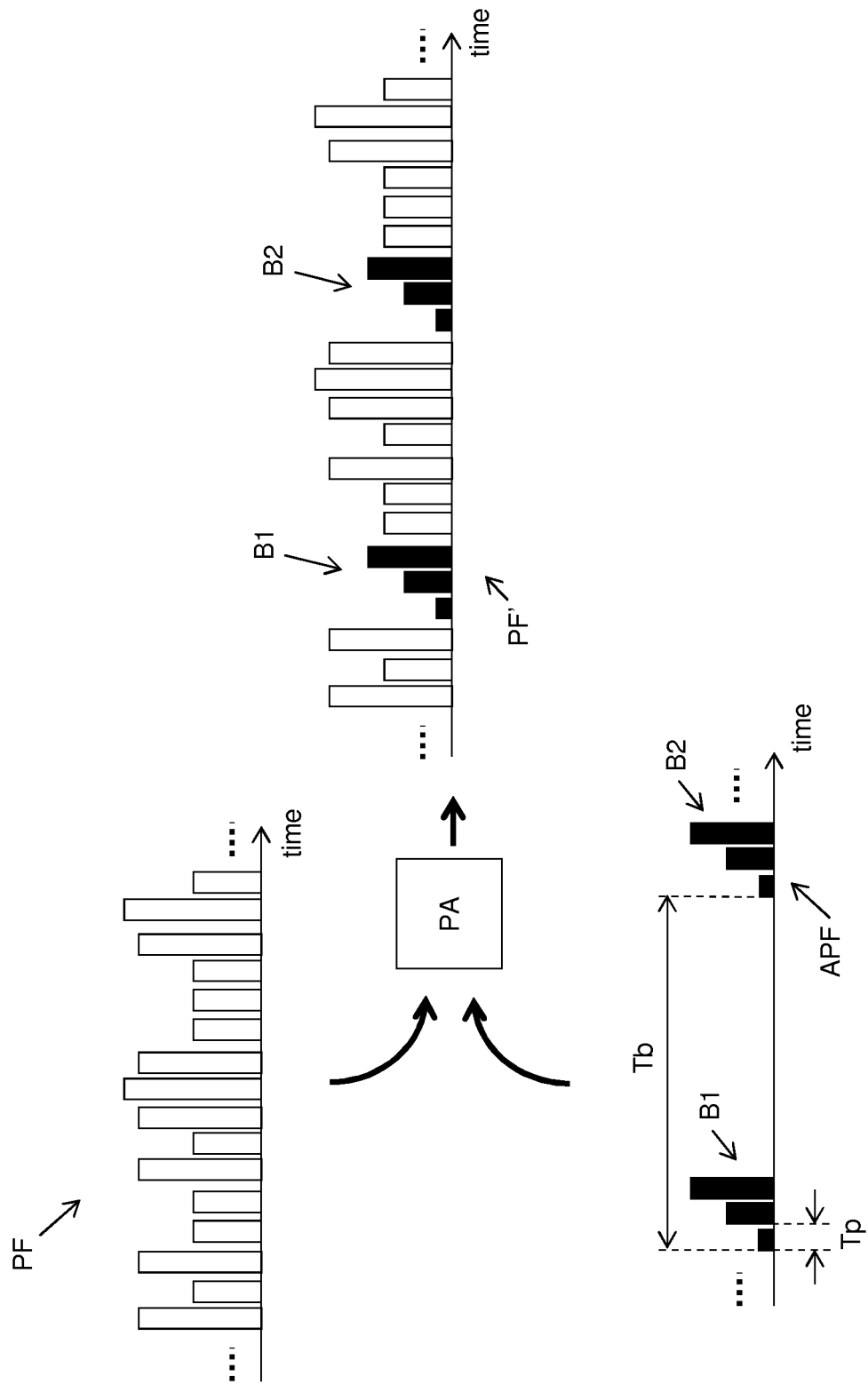
FIG. 2 schematically shows the operation of the packet aggregator according to embodiments of the present invention.

FIG. 1 schematically shows an exemplary packet-switched communication network CN in which the method for performing a performance measurement according to embodiments of the present invention is implemented. The communication network CN may be an IP network, an Ethernet network, an MPLS network or any other known type of packet-switched communication network.

The communication network CN comprises a plurality of nodes reciprocally interconnected by links according to any known topology. In particular, the communication network CN comprises a first node N1 and a second node N2.

A packet flow PF is preferably transmitted from the first node N1 to the second node N2, possibly through intermediate nodes (not shown in FIG. 1) of the communication network CN. The first node N1 may be either the source node of the packet flow PF or an intermediate node of the path from the source node to the destination node. Similarly, the second node N2 may be either the destination node of the packet flow PF or an intermediate node of the path from the source node to the destination node. Further, the packet flow PF may comprise data packets generated by a same source node and addressed to a same destination node. Alternatively, the packet flow PF may be a "macro-flow" comprising data packets generated by different source nodes and/or addressed to different destination nodes, which only share a length of their paths between the first node N1 and the second node N2.

Preferably, each data packet of the packet flow PF comprises a header and a payload. The payload comprises user data. Moreover, preferably, the header comprises information for routing the data packet. The header format depends on the protocol according to which the data packets are formatted.

Preferably, the communication network CN is provided with a management server MS. The management server MS may be either a stand-alone server connected to any of the nodes of the communication network CN. Alternatively, the management server MS may be implemented at any of the nodes of the communication network CN.

According to embodiments of the present invention, in order to implement a performance measurement on the packet flow PF, the communication network CN is provided with a generator of artificial packets APG configured to generate a flow of artificial packets APF. The generator APG may be implemented as a stand alone device connected to a node crossed by the packet flow PF, e.g. the node N1 as schematically depicted in FIG. 1. Alternatively, the generator APG may be embedded within a node crossed by the packet flow PF to be measured (e.g. the node N1). Alternatively, the generator APG may be implemented as a SW application possibly executed by a virtual machine (namely, by a shared HW not specifically dedicated to this purpose but used also for executing other network functionalities).

In any case, the artificial packets are preferably configured to follow through the communication network CN at least a length of the path of the packet flow PF, preferably starting from the node to which the generator APG is connected (or in which it is embedded), namely from N1 in the exemplary scenario of FIG. 1.

Further, the communication network CN is also preferably provided with a packet aggregator PA configured to aggregate the flow of artificial packets APF and the packet flow PF to be measured into an aggregated packet flow PF'. The packet aggregator PA is preferably implemented at the node to which the generator APG is connected (or in which it is embedded). In the exemplary scenario depicted in FIG. 1, the packet aggregator PA is accordingly implemented within the node N1.

Further, the communication network CN is also preferably provided with at least two measurement points MP1, MP2 located on the path length followed by the aggregated packet flow PF', downstream the packet aggregator PA. In FIG. 1, by way of non limiting example, two measurement points are shown: a first measurement point MP1 implemented at the first node N1 (namely, at the same node at which aggregation is carried out) and a second measurement point MP2 implemented at the second node N2. In particular, the first measurement point MP1 may be implemented at the output port of the first node N1 through which the aggregated packet flow PF' is transmitted to the second node N2, while the second measurement point MP2 may be implemented at the input port of the second node N2 through which the aggregated packet flow PF' is received from the first node N1, as depicted in FIG. 1.

Even though the following description refers to two measurement points only, this is not limiting and further measurement points may be provided on the path length followed by the aggregated packet flow PF', either between N1 and N2 or after N2. Further, even if it has been assumed that the first measurement point MP1 is implemented at the same node N1 where the aggregator PA is implemented, this is not limiting. According to other embodiments not shown in the drawings, all the measurement points may be implemented at nodes following N1 at which the aggregator PA is implemented.

Each measurement point MP1, MP2 may be either embedded within the respective node N1, N2, or implemented as a stand-alone machine connected to the respective node N1, N2. Independently of their implementation, the measurement points MP1, MP2 are preferably configured to identify the artificial packets and to provide raw performance measurements on the received packets, which will then be used (e.g. by the management server MS) for providing performance measurements relating to the packet flow PF.

The operation of the artificial packet generator APG, packet aggregator PA and measurement points MP1, MP2 will be described in further detail herein after.

As described above, the generator APG is configured to generate the flow of artificial packets APF.

Preferably, the destination address of the artificial packets is selected so that they follow the same path as the packet flow PF, at least for a length thereof starting from the node N1 at which aggregation was carried out. The destination address may be such that the artificial packets reach the same destination node as the packet flow PF. Alternatively, the destination address of the artificial packets may be such that the artificial packets are terminated on a probe, a server or any apparatus of the network manager.

The artificial packets may be configured so that the nodes of the communication network CN treat them the very same way as the data packets of the packet flow PF, at least along the path length followed by the packet flow PF aggregated with the flow of artificial packets APF. This guarantees that the nodes of the communication network CN do not voluntarily change the sequence of data packets and artificial packets in the aggregated packet flow PF' due e.g. to a higher class of service of the data packets. Specifically, the artificial packets preferably have the same format as the data packets of the packet flow PF (e.g. Ethernet, IPv4, IPv6, etc.). The artificial packets may have the same priority or class of service as the data packets of the packet flow PF or a higher priority or class of service. The advantages of the latter option will be discussed in further detail herein after.

According to alternative embodiments, the artificial packets may be e.g. packets as those used for the ping technique, namely compliant with the known Internet Control Message Protocol (ICMP).

Moreover, the artificial packets of the flow APF as generated by the generator APG are preferably configured to be identifiable by each measurement point MP1, MP2 without relying on their content, namely to be distinguishable from the data packets of the packet flow PF even if their content can not be used for identification purposes by the measurement points MP1, MP2.

In this respect, the Applicant has noticed that statistical analyses of real traffic in a communication network (e.g. IPv4 traffic or IPSec unispectable traffic in an IPSec tunnel) typically show a bimodal distribution of the packet lengths, namely a distribution with two peaks. In other words, data packets of different lengths may show very different probabilities of being observed. Depending on the type of protocol used, some of the allowed packet lengths exhibit higher probabilities, whereas other packets lengths allowed by the protocol exhibit lower probabilities. For instance, starting from statistical data collected by the CAIDA (Center for Applied Internet Data Analysis) on IPSec packets and published on the CAIDA Internet site, the Applicant has observed that, on a set of about 40 millions IPSec packets observed, 50 packet lengths amongst the 365 ones allowed by the protocol showed a probability of being singularly observed of less than $10^{-5}$ (5 of them being completely absent from the observed sample packets).

The Applicant has realized that predefined packet lengths may be used for the artificial packets, in order to make them distinguishable from data packets. Indeed, an artificial packet with a predefined packet length having a certain probability P of being singularly observed in the data packets may be singularly identified (namely, singularly distinguished from data packets) based on its length with an error probability equal to P.

Moreover, a burst of N artificial packets whose predefined packet lengths have a certain probability P of being singularly observed in the data packets may be identified as a whole (namely, distinguished as a whole in the flow of data packets) based on the sequence of packet lengths comprised therein with an error probability equal to $P^N$. If B is the link capacity and L is the packet length chosen for the bursts of artificial packets, the sequence of packet lengths of the bursts will be observed in the packet flow PF every $[1/(P^N)] \times (L/B)$ seconds.

For instance, on a 10 Gb/s link transmitting a packet flow PF with an average packet length of 850 Bytes (namely, 6800 bits), the maximum packet rate which may be achieved is (10 Gb/s)/(6800 b/packet)≅1500000 packet/s. Bursts of N=3 artificial packets whose packet lengths have a probability of being singularly observed in the packet flow PF of $10^{-5}$ have a probability of being observed as a whole in the packet flow PF of about $P^N = 10^{-15}$. This is a substantially negligible value for the identification error probability, because it implies that the sequence of packet lengths of the bursts will be observed in the packet flow PF every $10^{15}/(10^{10}/6800) = 6800 \cdot 10^5$ seconds, namely every 21 year.

Therefore, according to preferred embodiments of the present invention, the artificial packets of the artificial packet flow APF generated by the artificial packet generator APG are provided with predefined packet lengths. The predefined packet lengths of the artificial packets are preferably selected amongst those allowed by the protocol and also by the nodes of the communication network CN, in order to avoid drop or fragmentation of the artificial packets.

According to particularly preferred embodiments, the artificial packets generated by the generator APG are grouped into bursts of two or more artificial packets. All the bursts may comprise a same number N>2 of artificial packets having different predefined packet lengths appearing in the same order in all the bursts. In order words, all the bursts comprise the same ordered sequence of predefined packet lengths. This is schematically depicted in FIG. 2, where two bursts B1, B2 are shown, each one comprising N=3 artificial packets.

Figure 3:
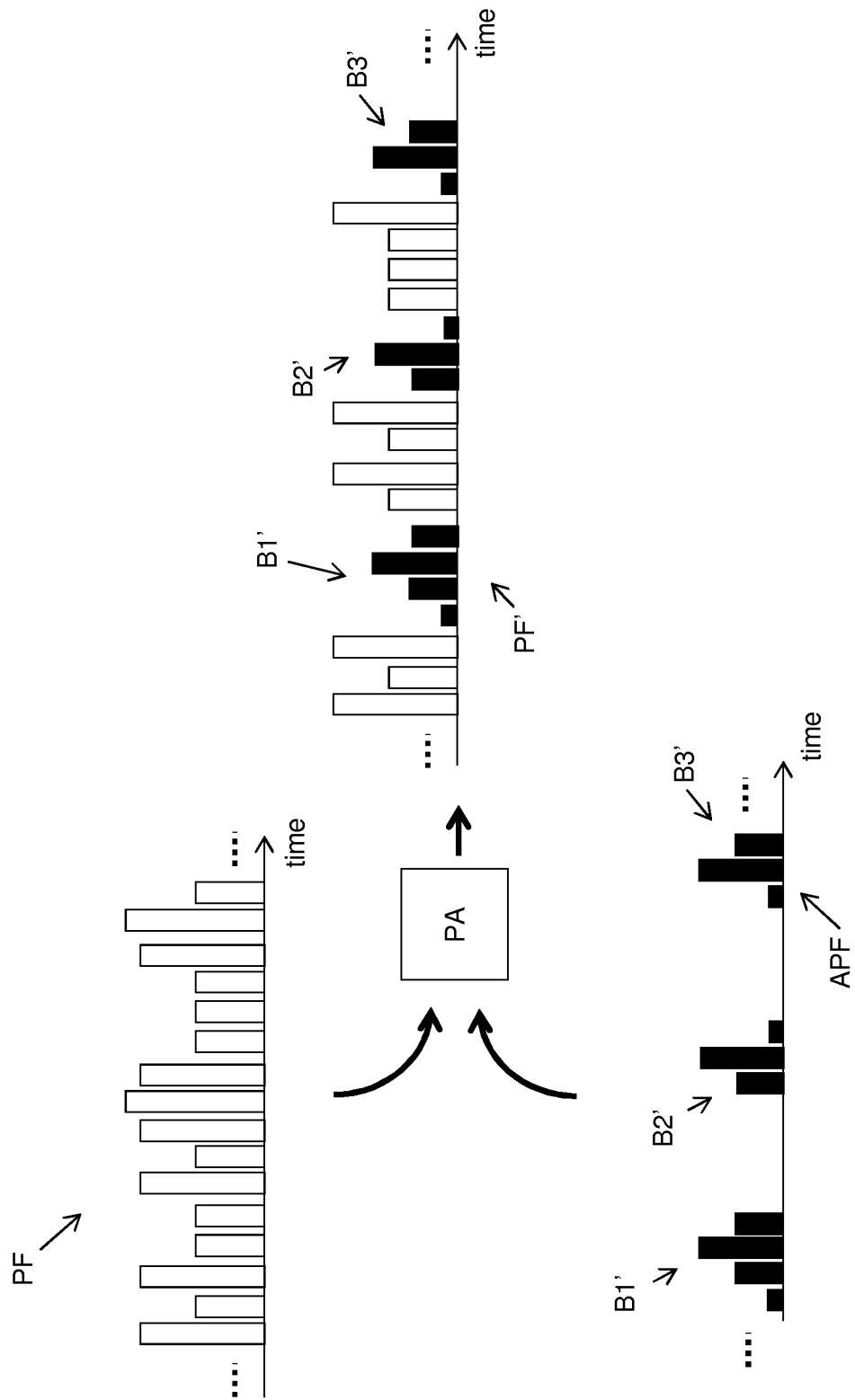
FIG. 3 schematically shows the operation of the packet aggregator according to other embodiments of the present invention.

This is however not limiting. According to other embodiments, different bursts may comprise different numbers of artificial packets with different predefined packets lengths. In other words, different bursts may comprise different ordered sequences of predefined packet lengths, as schematically depicted in FIG. 3. FIG. 3 shows three exemplary bursts of artificial packets B1', B2' and B3', each one comprising a respective number of artificial packets (N=4 for B1' and N=3 for B2' and B3') with packet lengths arranged according to a respective ordered sequence. Each ordered sequence of predefined packet lengths may appear in a single burst during the whole measurement session, or it may be periodically repeated. In the latter case, with reference to the exemplary scenario of FIG. 3, the ordered sequences of predefined packet lengths appearing in bursts B1', B2' and B3' could be periodically repeated e.g. every 3 bursts, meaning that subsequent bursts B4', B7', etc. (not shown in FIG. 3) would exhibit the same sequence as B1', while subsequent bursts B5', B8', etc. (not shown in FIG. 3) would exhibit the same sequence as B2' and subsequent bursts B6', B9', etc. (not shown in FIG. 3) would exhibit the same sequence as B3'. Use of different sequences of predefined packet lengths in different bursts allows the measurement points MP1, MP2 distinguishing each burst at least from the preceding one and the successive one, as it will be discussed in detail herein after.

The artificial packet generator APG may generate the bursts of artificial packets either periodically or non-periodically. According to preferred embodiments, the generator APG periodically generates the bursts of artificial packets with a certain burst rate 1/Tb. Within each burst, the artificial packets are generated with a certain artificial packet rate 1/Tp. Preferably, the burst rate 1/Tb and the artificial packet rate 1/Tp are independent of the packet rate of the packet flow PF to be measured and are preferably selected taking into account various factors, as it will be discussed in detail herein after.

As mentioned above, the packet aggregator PA is configured to aggregate the packet flow PF with the flow of artificial packets APF, namely to insert or inject the artificial packets amongst the data packets of the packet flow PF so as to provide an aggregated packet flow PF', as schematically depicted in FIGS. 2 and 3.

The aggregator PA preferably inserts the bursts of artificial packets into the packet flow PF as it receives them from the artificial packet generator APG. The packet aggregator PA is advantageously not obliged to insert the bursts of artificial packets at predefined instants or predefined positions of the packet flow PF. The timeliness with which the packet aggregator PA inserts the bursts of artificial packets into the packet flow PF depends on the SW/HW resources available at the node N1 for implementing the aggregation function. In general, since the SW/HW resources are limited, the packet aggregator PA introduces a certain unpredictable delay between the time at which a burst of artificial packets is generated by the generator APG and the time at which the same burst of artificial packets is inserted into the packet flow PF.

As shown in FIGS. 2 and 3, the bursts of artificial packets basically split the packet flow PF into a sequence of blocks, each burst of artificial packets delimiting two consecutive blocks of data packets. The number of data packets forming each block delimited by two consecutive bursts of artificial packets depends not only on the burst rate 1/Tb of the generator APG, but also on the unpredictable delay added by the aggregator PA and the packet rate of the packet flow PF. Statistically, a higher burst rate 1/Tb of the generator APG results in shorter blocks of data packets, while a lower burst rate 1/Tb of the generator APG results in longer blocks of data packets.

Hence, on the one hand, a lower burst rate 1/Tb results in reduced computational effort by the measurement points MP1, MP2 and a lower bandwidth consumption in the communication network CN for gathering the raw performance measurements from the measurement points. Moreover, a lower burst rate 1/Tb reduces the risk of reception sequence errors involving the bursts of artificial packets, which errors could prevent properly correlating raw performance measurements generated by different measurement points for a same block of data packets.

According to some variants, proper correlation of raw performance measurements relating to a same block of data packets is guaranteed by providing each burst of artificial packets with an ordered sequence of predefined packet lengths different from the sequences of predefined packet lengths appearing at least in the previous burst and in the following burst, as described above and shown in FIG. 3. This way, the ordered sequence of predefined packet lengths in a burst allows distinguishing the burst at least from the preceding one and the next one and, as a consequence, it allows to properly correlate raw performance measurements of a "well identified" block of data packets.

According to other variants, the risk of improper correlation of raw performance measurements relating to different blocks of data packets is reduced by providing Tb much longer (at least one order of magnitude) than the potential mismatch of the clocks at the measurement points MP1, MP2, so as to minimize the risk of reception sequence errors involving the bursts of artificial packets.

On the other hand, however, a lower burst rate 1/Tb reduces the granularity of the measurement results, which reflect more roughly the behaviour of the packet flow PF.

The burst rate 1/Tb applied by the generator APG is therefore tailored to balance the above trade-off, depending on the amount of available computational resources, the required measurement granularity and the probability of reception sequence errors in the communication network CN.

As mentioned above, the measurement points MP1, MP2 are preferably configured to identify the artificial packets in the aggregated packet flow PF' and to generate raw performance measurements, which will then be used (e.g. by the management server MS) for providing performance measurements relating to the packet flow PF.

More particularly, the measurement point MP1 preferably receives all traffic exiting the node N1 via the output port at which MP1 is implemented (or a copy thereof) and, similarly, the measurement point MP2 preferably receives all traffic entering the node N2 via the input port at which MP2 is implemented (or a copy thereof).

With reference to the flow chart of FIG. 4 (starting at start block 400 and ending at end block 406), for each packet included in the received traffic, each measurement point MP1, MP2 preferably generates and stores a timestamp indicating the time at which the packet is received at the measurement point MP1, MP2 and its packet length (step 401). The packet length may be stored in terms of number of bits or number of bytes included in the packet. This way, each measurement point MP1, MP2 populates a local database which stores an ordered list of timestamps and packet lengths of the received packets, the order being given by the timestamp values.

Then, each measurement point MP1, MP2 preferably identifies the packets of the aggregated packet flow PF' (with no distinction between artificial packets and data packets) in the received traffic (step 402), e.g. using an address filtering technique (source or destination address in the transport header of the packet). Upon identification of each packet of the aggregated packet flow PF', each measurement point MP1, MP2 preferably stores only the timestamps and packet lengths relating to the packets of the aggregated packet flow PF'. The other timestamps and packet lengths generated at step 401 are preferably discarded from the local database.

Each measurement point MP1, MP2 then preferably identifies the artificial packets included in the received packets of the aggregated packet flow PF' (step 403). To this purpose, each measurement point MP1, MP2 is preferably previously configured to recognize the ordered sequence(s) of predefined packet lengths that (short of reception sequence errors and/or packet losses involving the artificial packets) should appear in the bursts of artificial packets.

According to some embodiments, the identification of the artificial packets is performed online, namely the clock of each measurement point MP1, MP2 is synchronized to the reception packet rate so that, upon reception of each packet, the measurement point MP1, MP2 determines whether it is part of the aggregated packet flow PF' (step 402) and, in the affirmative, whether it is part of a burst of artificial packets (step 403) before reception of the next packet. The online processing may be implemented in a particularly easy way e.g. when each burst of artificial packets comprises a single packet.

According to other embodiments, the identification of the artificial packets is performed offline, namely each measurement point MP1, MP2 periodically queries its local database to determine ordered sequence(s) of predefined packet lengths that should appear in the bursts of artificial packets, the query rate being asynchronous with respect to (preferably, smaller than) the reception packet rate. For instance, each measurement point MP1, MP2 may query its local database with a query rate substantially equal to the burst rate 1/Tb.

In the latter case, at step 403, each measurement point MP1, MP2 preferably looks up its local database to check whether the ordered list of packets lengths stored in its local database contains any occurrence of the ordered sequence(s) of predefined packet lengths. Each occurrence is preferably identified by the measurement point MP1, MP2 as a burst of artificial packets.

Therefore, advantageously, each measurement point MP1, MP2 identifies the artificial packets based on their length, and therefore without relying on their content. Therefore, even if the content of the packets of the aggregated packet flow PF' is uninspectable (e.g. because both artificial packets and data packets are encrypted and/or encapsulated within a tunnel) or if the packet content is changed as the packets of PF' propagate along their path from N1 to N2 (e.g. by a node placed at an administrative boundary between N1 and N2), the measurement points MP1, MP2 may nonetheless recognize the artificial packets in the aggregated packet flow PF'.

This technique for identifying bursts of artificial packets based on their lengths may lead to two different types of identification errors:

(i) false positive: an ordered sequence of predefined packet lengths—which is supposed to appear almost exclusively in the bursts of artificial packets—accidentally appears in the data packets of the packet flow PF to be measured. Hence, a measurement point MP1, MP1 accidentally mistakes a sequence of data packets for a burst of artificial packets.

(ii) false negative: a measurement point MP1, MP2 fails to recognize a burst of artificial packets, e.g. because of a packet loss or a reception sequence error involving the artificial packets of the burst.

Identification errors of the false positive type advantageously are not detrimental to the performance measurement, as long as the ordered sequence of data packets accidentally mistaken for a burst of artificial packets is preserved along the path and is then identified as a burst by all the measurement points distributed along the path. If such an event becomes too frequent, however, the granularity of the performance measurement and the computational effort for measurement purposes may become too high.

Identification errors of the false negative type, on the other hand, have no impact as long as they occur at all the measurement points located downstream the packet aggregator PA. However, if the identification error occurs at some of the measurement points only, segmentation of the packet flow PF is compromised, unless a post-processing technique is applied in order to recover a consistent segmentation of the packet flow PF at all the measurement points.

In order to reduce the probability of identification errors of the false negative type, one or more of the following techniques are preferably adopted:

- generating the artificial packets in each burst with a packet rate 1/Tp high enough to reduce the probability that the nodes distributed along the path of the aggregated packet flow PF' interleave data packets in the burst of artificial packets;
- generating the artificial packets so that the nodes provide them with a preferential treatment (e.g. low latency queuing) in order to reduce their drop probability. This is advantageous at particularly congested nodes (e.g. DSLAMs) and may be implemented, for instance, by providing the artificial packets with a priority and/or a class of service higher than the data packets.
- generating the artificial packets with shorter packet lengths in order to reduce their drop probability due to transmission errors; and/or
- configuring the measurement points MP1, MP2 to recognize the predefined ordered sequences of packet lengths with a certain tolerance (e.g. a burst is identified as such even if 1-2 artificial packets are missing and/or even if 1-2 unexpected packet lengths are present in its ordered sequence of packet lengths), in order to provide a certain tolerance to packet loss and/or reception sequence errors involving the artificial packets of a burst.

In order to reduce the probability of identification errors of the false positive type, one or more of the following techniques are preferably adopted:

- providing the artificial packets with predefined packet lengths having low probabilities to singularly appear in the packet flow PF to be measured;
- providing the bursts of artificial packets with sequence(s) of predefined packet lengths having low probabilities to appear in the packet flow PF to be measured; and/or
- generating and aggregating the artificial packets within predefined time windows, so that the measurement points MP1, MP2 may circumscribe the research of bursts of artificial packets in the aggregated packet flow PF' during those time windows. This technique preferably requires a rough synchronization between generator APG, aggregator PA and measurement points.

It may be appreciated that the number of artificial packets N in the bursts affects the probability of identification errors of both the false positive type and the false negative type. The higher N, the smaller the probability to find the predefined sequence of N packet lengths in the packet flow PF to be measured, and hence the smaller the probability of false positive errors. However, the higher N, the higher the probability of packet loss and/or reception sequence errors involving the artificial packets of a burst, and hence the higher the probability of false negative errors. The number N is accordingly preferably tailored to balance this trade-off. In particular, N is preferably comprised between 1 and 5. For instance, N may be equal to 1 (which eases the online identification of artificial packets by the measurement points MP1 and MP2, as described above), or it may be equal to 2 or 3.

Upon identification of a burst of artificial packets in the received packets of PF', each measurement point MP1, MP2 preferably determines and stores raw performance measurement relating to the packets of PF'.

In particular, upon identification of a burst of artificial packets in the received packets of PF', each measurement point MP1, MP2 preferably stores at least one of (i) number of artificial packets comprised in the identified burst, (ii) timestamps of the artificial packets of the identified burst and (iii) packet lengths of the artificial packets of the identified burst (step 404).

Then, each measurement point MP1, MP2 preferably provides and stores at least one of (i) number of received data packets comprised in the block terminated by the identified burst, (ii) cumulative timestamp of the data packets comprised in the block terminated by the identified burst and (iii) cumulative packet length of the data packets comprised in the block terminated by the identified burst (step 405).

At step 405, each measurement point MP1, MP2 preferably provides the number of received data packets comprised in the block terminated by the identified burst by counting them in its local database.

Moreover, at step 405 each measurement point MP1, MP2 preferably provides the cumulative timestamp of the data packets comprised in the block terminated by the identified burst by summing up the timestamps stored in its local database for the data packets comprised in the block terminated by the identified burst.

Moreover, at step 405 each measurement point MP1, MP2 preferably provides the cumulative packet length of the data packets comprised in the block terminated by the identified burst by summing up the packet lengths stored in its local database for the data packets comprised in the block terminated by the identified burst.

Steps 404-405 are iterated for each identified burst of artificial packets by each measurement point MP1, MP2, until the end of the measurement session.

Hence, during the measurement session, the measurement point MP1 preferably provides, for each identified burst of artificial packets:

(i) an artificial transmission counter $AC1(k)$ indicating the number of artificial packets in the $k^{th}$ burst as transmitted by the node N1 and/or transmission timestamps $T1_1(k), \ldots T1_{AC1}(k)$ indicating the times at which the artificial packets of the $k^{th}$ burst have been transmitted by the node N1 and/or packet lengths $L1_1(k), \ldots L1_{AC1}(k)$ of the artificial packets of the $k^{th}$ burst as transmitted by the node N1; and (ii) a data transmission counter $DC1(k)$ indicating the number of data packets which form the block terminated by the $k^{th}$ burst of artificial packets as transmitted from the node N1, and/or a cumulative transmission timestamp $CT1(k)$ which is the summation of the transmission times from the node N1 of the data packets which form the block terminated by the $k^{th}$ burst of artificial packets, and/or a cumulative packet length $CL1(k)$ which is the summation of the packet lengths of the data packets which form the block terminated by the $k^{th}$ burst of artificial packets as transmitted by the node N1.

Similarly, the measurement point MP2 preferably provides, for each identified burst of artificial packets:

(i) an artificial transmission counter $AC2(k)$ indicating the number of artificial packets in the $k^{th}$ burst as received by the node N2 and/or reception timestamps $T2_1(k), \ldots T2_{AC2}(k)$ indicating the times at which the artificial packets of the $k^{th}$ burst have been received by the node N2 and/or packet lengths $L2_1(k), \ldots L2_{AC2}(k)$ of the artificial packets of the $k^{th}$ burst as received by the node N2; and (ii) a data reception counter $DC2(k)$ indicating the number of data packets which form the block terminated by the $k^{th}$ burst of artificial packets as received by the node N2, and/or a cumulative reception timestamp $CT2(k)$ which is the summation of the reception times at the node N2 of the data packets which form the block terminated by the $k^{th}$ burst of artificial packets, and/or a cumulative packet length CL2(k) which is the summation of the packet lengths of the data packets which form the block terminated by the $k^{th}$ burst of artificial packets as received by the node N2.

If each burst of artificial packets may be uniquely identified by the measurement point (e.g. it comprises an ordered sequence of packet lengths different at least from the previous burst and the following burst, as shown in FIG. 3), each measurement point MP1, MP2 preferably also associates a unique identifier to raw performance measurements relating to each identified burst of artificial packets.

It shall be noticed that all the raw performance measurements provided by the measurement points MP1, MP2 according to the flow chart of FIG. 4 reflect the actual features of the aggregated packet flow PF'.

In particular, the timestamps relating to the artificial packets as transmitted by the node N1 reflect the actual transmission times of the artificial packets from the node N1, since such timestamps are generated only after the artificial packets have been inserted into the packet flow PF. Hence, even if the packet aggregator PA introduces an unpredictable delay—as discussed above—between the time at which an artificial packet is received from the generator APG and its actual transmission time, this does not impair the accuracy of the time (delay and jitter) measurements, since this measurement is based on a transmission timestamp which reflects the real behaviour of the artificial packet, not the expected one. The performance measurement results are therefore accurate even if the packet aggregator PA does not precisely insert the bursts artificial packets every Tb time units and with a packet rate 1/Tp.

As mentioned above, the raw performance measurements provided by the measurement points MP1, MP2 are used (e.g. by the management server MS) for providing performance measurements relating to the packet flow PF. To this purpose, the measurement points MP1, MP2 preferably send the respective raw performance measurements to the management server MS. The raw performance measurements may be sent during dedicated communication sessions between measurement points MP1, MP2 and management server MS, or within the payload of artificial packets sent from the measurement points MP1, MP2 to the management server MS.

Starting from those raw performance measurements, the management server MS preferably provides one or more of the following performance measurements:

(i) one-way delay measurement of the $i^{th}$ artificial packet of the $k^{th}$ identified burst as:

$OWD_i(k)=T2_i(k)-T1_i(k)$, with $i=1, \ldots AC1(k)$;

(ii) jitter measurement of the artificial packets as, for instance:

$J(k)=OWD_i(k)-OWD_{i+1}(k)$;

(iii) packet loss measurements of the flow of artificial packets APF as:

$APL(k)=AC1(k)-AC2(k)$;

(iv) packet loss measurement in the block of data packets terminated by the $k^{th}$ burst of artificial packets as:

$DPL(k)=DC1(k)-DC2(k)$;

(v) average one-way delay measurement of the block of data packets terminated by the $k^{th}$ burst of artificial packets as (valid only in absence of packet loss):

$$AOWD(k) = \frac{CT2(k)}{DC2(k)} - \frac{CT1(k)}{DC1(k)};$$

(vi) average jitter for data packets as, for instance:

$AJ(k)=AOWD(k)-AOWD(k-1)$;

(vii) throughput of the data packets as:

$THR(k)=CL2(k)/(T2_{AC2}(k)-T2_{AC2}(k-1))$.

As discussed above, these performance measurements are advantageously accurate without requiring precise insertion of the artificial packets in the packet flow PF.

It may be appreciated that reception sequence errors could cause one or more artificial packet of a bursts to be overtaken by one or more data packets of the block ended by or started by that burst. This could lead to a false packet loss indication, since the number of packets included in the block is apparently reduced. In order to obviate to this drawback, a post-processing of packet lengths and timestamps may be carried out in order to:

identify the blocks of data packets that, at a certain measurement point, apparently comprises less or more packets than at the previous measurement point;

identify the original number of packets for each block; and re-apply the packet loss calculation by properly correcting the number of packets in each block at each measurement point.

According to some variants, the flow of artificial packets APF may also be used for continuous test of the link between the nodes N1 and N2 in the absence of real traffic. In order to perform such continuous test, the generator APG generates a burst of N artificial packets every Tb time units, so that—even in the absence of real traffic—the bursts of artificial packets are transmitted substantially periodically from node N1.

In the above description, reference has been made to a scenario where two measurement points MP1, MP2 are present, which provide respective raw performance measurements enabling end-to-end performance measurements between the nodes N1 and N2. This is not limiting. According to other scenarios, three or more measurements points may be provided on the path length followed by the aggregated packet flow PF', which provide respective raw performance measurements. Those raw performance measurements enable both end-to-end measurements (between the first and last measurement points) and partial measurements (between consecutive measurement points).

It shall also be noticed that the above described performance measurement is inherently unidirectional, namely it provides performance measurements relating to transmission from a certain node (N1) to another node (N2). In order to provide performance measurement also for the opposite direction (from N2 to N1), a further artificial packet generator and a further packet aggregator shall be provided, which generate a further flow of artificial packets and aggregate them, e.g. at the node N2, with a further packet flow transmitted from node N2 to node N1.

Further, the performance method may be applied for measuring any number of packet flows. Indeed, independently of the number of packet flows to be measured, the method may be implemented by providing a packet generator, a packet aggregator and at least two measurement points for each packet flow to be measured. If two or more packet flows to be measured have at least partially overlapping paths, their generators and/or their aggregators and/or their measurement points (which preferably apply respective filtering functions in order to identify the respective aggregated packet flows to be processed) may be co-located or even integrated in a same device.

The above performance measurement may be implemented in different scenarios.

A first exemplary scenario is a mobile communication network (e.g. an LTE network) comprising several base stations, a backhauling network and at least one packet gateway connecting the mobile communication network e.g. to an IP backbone. An artificial packet generator APG and a packet aggregator PA may be implemented in each base station to aggregate bursts of artificial packets having predefined packet lengths with the upstream traffic gathered by the base station. The aggregated packet flow is then sent to the packet gateway(s) via the backhauling network. Two measurement points MP1, MP2 may be implemented e.g. in the base station and in the packet gateway, which provide raw performance measurements (counters and/or timestamps and/or packet lengths) allowing to measure the performance of the upstream traffic between the base station and the packet gateway.

A second exemplary scenario is a fixed access network, for instance a DSL (Digital Subscriber Line) network comprising a DSLAM (DSL Access Multiplexer) connected to a number of end user and a BNG (Broadband Network Gateway) connected to the DSLAM via a transport link (e.g. an Ethernet link) and connecting the fixed access network to a core network. An artificial packet generator APG may be connected to the DSLAM, which acts itself as a packet aggregator aggregating the bursts of artificial packets generated by the generator APG with the upstream packets from the end users into an aggregated packet flow, which is then sent to the BNG. Two measurement points MP1, MP2 may be e.g. at the DSLAM and at the BNG, which provide raw performance measurements (counters and/or timestamps) allowing to measure the performance of the fixed access network from the DSLAM to the BNG.

Hence, the performance measurement method according to embodiments of the present invention may be advantageously applied to any type of packet switched network, wherein it provides accurate results without requiring the precise insertion of artificial packets into predefined position of a packet flow, without requiring any marking of the data packets and without requiring any inspection of the packet content.

The invention claimed is:

1. A method for performing a performance measurement on a packet flow transmitted along a path through a packet switched communication network, said method comprising:
   a) generating a flow of artificial packets, each artificial packet having a packet length according to a predefined sequence of packet lengths;
   b) aggregating said flow of artificial packets with said packet flow at a node of said communication network located along said path, so as to provide an aggregated packet flow which is transmitted along at least a length of said path starting from said node;
   c) at a first measurement point located along said length of said path, identifying the aggregate flow based on address filtering and, after identifying the aggregate flow, identifying the artificial packets within the aggregate flow at the first measurement point based on said predefined sequence of packet lengths, the first measurement point providing a first raw performance measurement indicative of actual positions of said artificial packets in said aggregated packet flow;
   d) at a second measurement point located along said length of said path, identifying the aggregate flow based on address filtering and, after identifying the aggregate flow, identifying the artificial packets within the aggregate flow based on said predefined sequence of packet lengths, the second measurement point providing a second raw performance measurement indicative of actual positions of said artificial packets in said aggregated packet flow; and
   e) performing a performance measurement of said packet flow using said first and second raw performance measurements.

2. The method according to claim 1, wherein step a) comprises grouping said artificial packets into bursts of N artificial packets, N being equal to or higher than 1.

3. The method according to claim 2, wherein at step a) said number N of artificial packets per burst is equal to or higher than 2, and wherein said N artificial packets of each burst have different packet lengths ordered according to the predefined sequence of packet lengths.

4. The method according to claim 3, wherein at step a) said predefined sequence of packet lengths is the same in all the bursts of N artificial packets.

5. The method according to claim 4, wherein each one of said steps c) and d) comprises identifying said bursts of N artificial packets in said aggregated packet flow by checking whether a locally stored ordered list of packet lengths of received packets of said aggregated packet flow contains any occurrence of said predefined sequence of packet lengths, each occurrence of said predefined ordered sequence of packet lengths in said list being identified as a burst of artificial packets.

6. The method according to claim 3, wherein at step a) said predefined sequence of packet lengths is different in different bursts of N artificial packets.

7. The method according to claim 2, wherein said step b) comprises aggregating said flow of artificial packets so that said artificial packets split said packet flow into a sequence of blocks of data packets, each burst of artificial packets delimiting two consecutive blocks of data packets.

8. The method according to claim 2, wherein each one of said steps c) and d) comprises, upon identification of each burst of artificial packets, storing at least one of:
   (i) a counter indicating a number of artificial packets comprised in said identified burst;
   (ii) timestamps of artificial packets comprised in said identified burst; and
   (iii) packet lengths of artificial packets comprised in said identified burst.

9. The method according to claim 2, wherein each one of said steps c) and d) comprises, upon identification of each burst of artificial packets, storing at least one of:
   (i) a counter indicating a number of received data packets comprised in a block of data packets terminated by said identified burst;
   (ii) a cumulative timestamp of data packets comprised in said block of data packets terminated by said identified burst; and
   (iii) a cumulative packet length of data packets comprised in said block of data packets terminated by said identified burst.

10. The method according to claim 9, wherein said step e) comprises measuring at least one of:
   a one-way delay of each artificial packet;
   a jitter of said flow of artificial packets;

a packet loss of said flow of artificial packets;
a packet loss of said packet flow;
an average one-way delay of each block of data packets of said packet flow;
an average jitter of said packet flow; and
a throughput of said packet flow.

11. The method according to claim 1, wherein said predefined sequence of packet lengths indicates that the artificial packets have a same packet length.

12. The method according to claim 1, wherein each one of said steps c) and d) comprises identifying said artificial packets in said aggregated packet flow by comparing a packet length of each received packet of said aggregated packet flow with said predefined sequence of packet lengths.

13. A non-transitory computer-readable medium encoded with computer-readable instructions that, when executed by at least one computer, cause the at least one computer to perform the method according to claim 1.

14. A system for performing a performance measurement on a packet flow transmitted along a path through a packet switched communication network, said system comprising:
a) an artificial packet generator configured to generate a flow of artificial packets, each artificial packet having a packet length according to a predefined sequence packet lengths;
b) a packet aggregator implemented at a node located along said path and configured to aggregate said flow of artificial packets with said packet flow, so as to provide an aggregated packet flow which is transmitted along at least a length of said path starting from said node;
c) a first measurement point located along said length of said path and configured to identify the aggregate flow based on address filtering and, after identifying the aggregate flow, configured to identify the artificial packets within the aggregate flow based on said predefined sequence of packet lengths, the first measurement pint being further configured to provide a first raw performance measurement indicative of actual positions of said artificial packets in said aggregated packet flow;
d) a second measurement point located along said length of said path and configured to identify the aggregate flow based on address filtering and, after identifying the aggregate flow, configured to identify the artificial packets within the aggregate flow based on said predefined sequence of packet lengths, the second measurement point being further configured to provide a second raw performance measurement indicative of actual positions of said artificial packets in said aggregated packet flow; and
e) a management server configured to perform a performance measurement of said packet flow using said first and second raw performance measurements.

15. The system according to claim 14, wherein the system is included in the packet switched communication network.

* * * * *